United States Patent [19]

Becherer et al.

[11] 4,305,666
[45] Dec. 15, 1981

[54] OPTICAL HETERODYNE DETECTION SYSTEM AND METHOD

[75] Inventors: Richard J. Becherer, Concord; Wilfrid B. Veldkamp, Lexington, both of Mass.

[73] Assignee: Massachusetts Institute of Technology, Cambridge, Mass.

[21] Appl. No.: 87,904

[22] Filed: Oct. 24, 1979

[51] Int. Cl.³ .............................................. G01B 9/02
[52] U.S. Cl. ................................... 356/349; 350/3.81
[58] Field of Search .............. 356/349; 350/3.66, 3.81, 350/3.82

[56] References Cited

U.S. PATENT DOCUMENTS 3,939,342  2/1976  Bezerie et al. .................. 356/349 X

OTHER PUBLICATIONS

Inaba et al., "Infrared Laser Radar Technique using Heterodyne Detection for Range-Resolved Sensing of Air Pollutants", Optics Communications, vol. 14, pp. 119–122, May 1975.

Primary Examiner—John K. Corbin
Assistant Examiner—Matthew W. Koren
Attorney, Agent, or Firm—Arthur A. Smith, Jr.; Thomas J. Engellenner

[57] ABSTRACT

A system to achieve heterodyne detection of optical (i.e., infrared, visible and ultraviolet) signal wavefront is disclosed. The system employs a holographic phase grating that, when illuminated by laser radiation, will generate a plurality of wavefronts each of which has a predetermined spatial distribution of amplitude and phase. The grating is part of an optical local oscillator that includes a laser that illuminates the holographic phase grating. The system further includes a mechanism to receive an optical-signal wavefronts and combine this wavefront with a plurality of local-oscillator wavefronts to provide combined optical wave fields that are applied as input to an array of discrete detector elements; each detector of the array optimally mixes the one local-oscillator wavefront directed to it with the optical-signal wavefront and generates therefrom an electrical output with optimum detection efficiency and with optimum amplitude and fixed phase relationships to the outputs of the other detectors of the array. The optical heterodyne array detection system produces detection of a plurality of optical-signal, spatial-resolution elements simultaneously.

14 Claims, 7 Drawing Figures

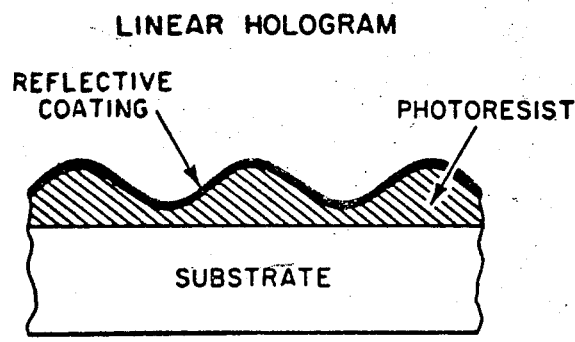
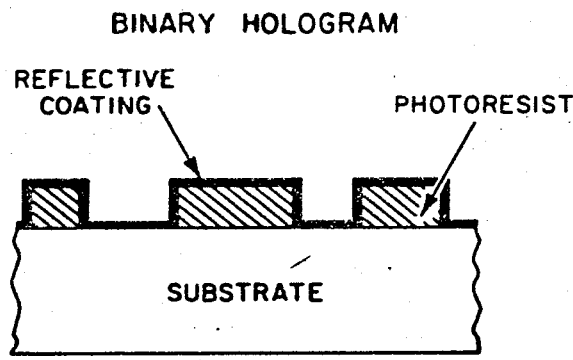
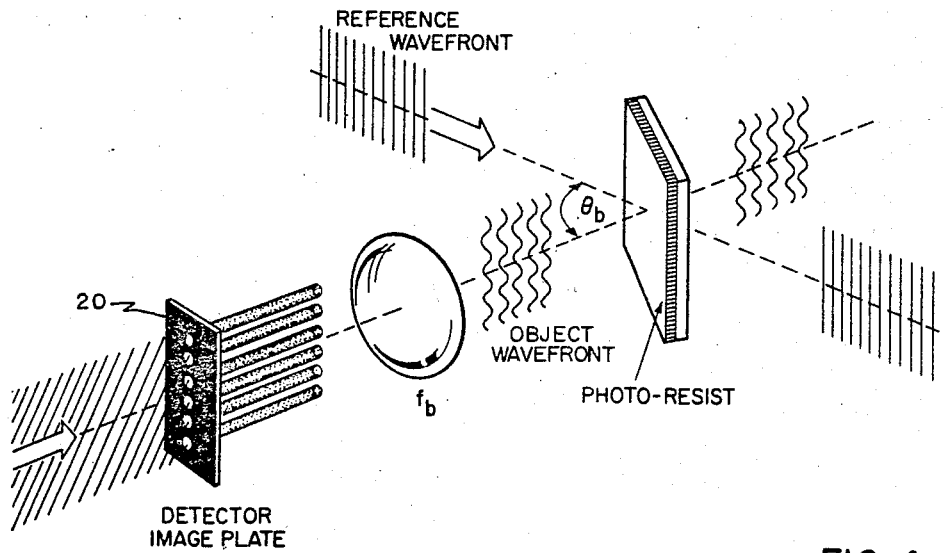

OPTICAL HETERODYNE DETECTION SYSTEM AND METHOD

The Government has rights in this invention pursuant to Contract No. AF19(628)-78-C-0002 awarded by Department of Airforce, Electronic Systems Division.

The present invention relates to optical heterodyne detection systems.

Optical heterodyne detection systems have use, for example, in laser communication, imaging radars using radiation in the optical region of the electromagnetic spectrum and heterodyne spectroscopy for chemical analysis. Each application may require many optical detectors in a linear array or more complex array configuration to accomplish the required purpose, and high resolution is needed. Optical detectors which have acceptable detection properties do not always detect the frequencies of interest with enough resolution and sensitivity; so heterodyning techniques are used. A most persistent problem with the combination of many optical detectors in a heterodyne configuration is the matter of correct amplitude and phase relationships between the signals and the local oscillators applied to the optical detectors of the array and the resultant outputs therefrom, since improper relationships result in cancellation of signals.

The angle between one local oscillator of the plurality and a signal element must be collinear (i.e., much less than $\lambda/d$, where $\lambda$ is the wavelength of the radiation and d the linear dimension of a detector element).

Previously to the present invention, a single uniform plane wave has been used as a local oscillator to illuminate a plurality of detector elements, which quickly leads to significant integrated heterodyne detection efficiency loss, $\eta$, over most detector elements, i.e., $$\eta = \frac{\left[\int_A |u_{LO}| |u_{signal}| \cos\phi \, dA\right]^2}{\int_A |u_{LO}|^2 dA \int_A |u_{signal}|^2 dA} << 1 \quad (1)$$

where:

A is the detector surface area of assumed uniform sensitivity $\phi$ is the angle between the propagation vectors $K_{LO}$ and $K_{signal}$ $u_{LO}$ is the local oscillator field strength $u_{signal}$ is the signal field strength $\eta$ is the heterodyne efficiency Accordingly it is an object of the present invention to provide an optical heterodyne detection system that overcomes the foregoing deficiencies in prior art systems.

Since in the present approach the holographic local oscillator to achieve collinearity of the angles between the signal and local oscillators far exceeds that set by $\lambda/d > 1$ for typical detector sizes in both the infrared (IR) and visible portions of the spectrum, the system resolution is limited only by the minimum detector size and necessary detector dead space; it is another object to provide an optical heterodyne system that provides high detection efficiency.

These and still further objects are addressed hereinafter.

The foregoing objects are achieved, generally, in an optical heterodyne detection system to achieve detection of optical-signal wavefronts using a plurality of discrete detector elements operating in parallel with correct relationships of local oscillator amplitudes and phase distributions between the optical-signal wavefronts and local-oscillator wavefronts. The detection system includes an array of discrete detector elements (which may be in a linear or more complex configuration) operating in parallel, each element of the array being operable to mix a local-oscillator wavefront with said optical-signal wavefronts to produce an electrical output with high detection efficiency and spatial resolution and with correct amplitude and phase relationships with like outputs from the other detector elements of the array. The system further includes a local oscillator to produce an electromagnetic field which is transformed by optical elements within the system to produce a plurality of local-oscillator wavefronts, each local-oscillator wavefront of the plurality serving to illuminate a discrete detector of the array of detectors; the optical elements include a holographic grating that acts to transform the electromagnetic field from the local oscillator into said plurality of local-oscillator wavefronts.

The invention is hereinafter described with reference to the accompanying drawing in which:

FIGS. 3A and 3B show, greatly enlarged, the characteristic features respectively of a linear phase hologram and a binary phase hologram;

FIG. 4 is a diagrammatic representation showing a mechanism for creating a linear phase relief hologram like the hologram of FIG. 3A;

Figure 1:
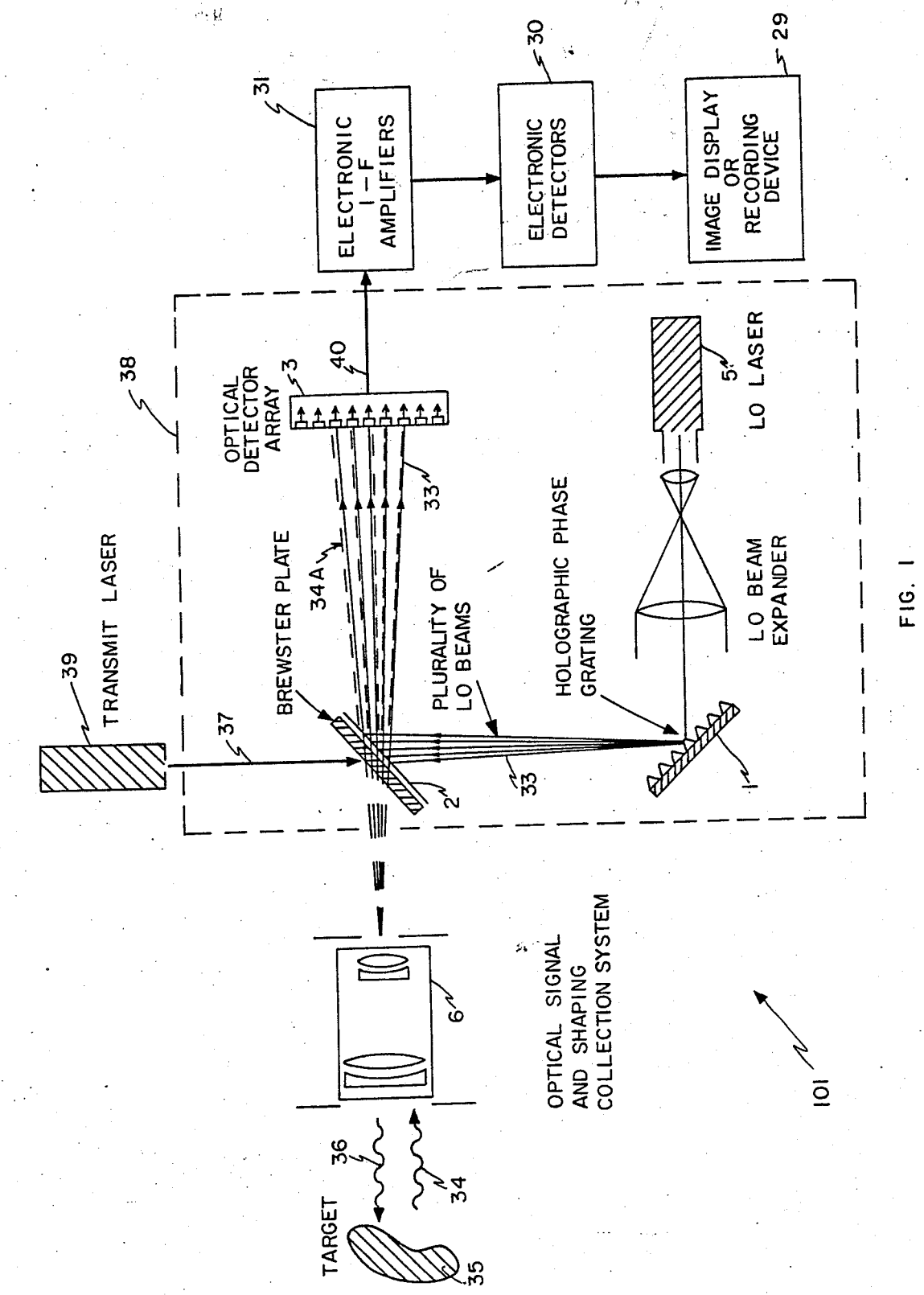
FIG. 1 is a diagrammatic representation of an active heterodyne imaging system.

Turning now to FIG. 1 there is shown at 101 an active heterodyne imaging system which includes a transmit laser 39 and an optical processing system 38. Briefly stated, the system 101 is an optical radar whereby the output labeled 37 of the laser 39 is reflected by a Brewster plate 7 to send an optical beam 36 to a target 35 which reflects the same at 34. Both the beams 36 and 34 pass through a telescope 6; this and other elements are discussed in some detail below, but, for now, it suffices to note that the beam 34 is aligned by a beam splitter 2 with a beam 33 which consists of a plurality of local-oscillator wavefronts having predetermined amplitude and phase relationships. In FIG. 1, the beam labeled 33 represents the plurality of local-oscillator wavefronts that are re-directed by the beam splitter 2 and the beam labeled 34 is the beam 34 after passage through the Brewster plate 7 and the beam splitter 2. The optical signals 33 and 34A are applied to an array of optical detectors 3 whose combined outputs are labeled 40. Hereinafter the optical signals 33 are termed local-oscillator wavefronts and the optical signal 34A is termed optical-signal wavefront. The system 101 contemplates many discrete optical detector elements in the array 3, as is noted below; typically there will be a hundred or more such detector elements but there may be as few as ten. Systems tested have used HgCdTe devices as detector elements. To complete the discussion of FIG. 1, the system includes an IF amplifier 31 that receives the multiple outputs 40 from the array 3 and an electronic detector 30 that receives the amplified signals and displays the signals at 29. The displayed image is a high resolution image. The system 101 further includes a local oscillator laser 5 and a holographic grating 1; the laser 5, the grating 1, a lens system 9A and 9B and a beam splitter 2 form, in combination, the local oscillator discussed below, which generates the local-oscillator wavefronts 33.

Figure 2:
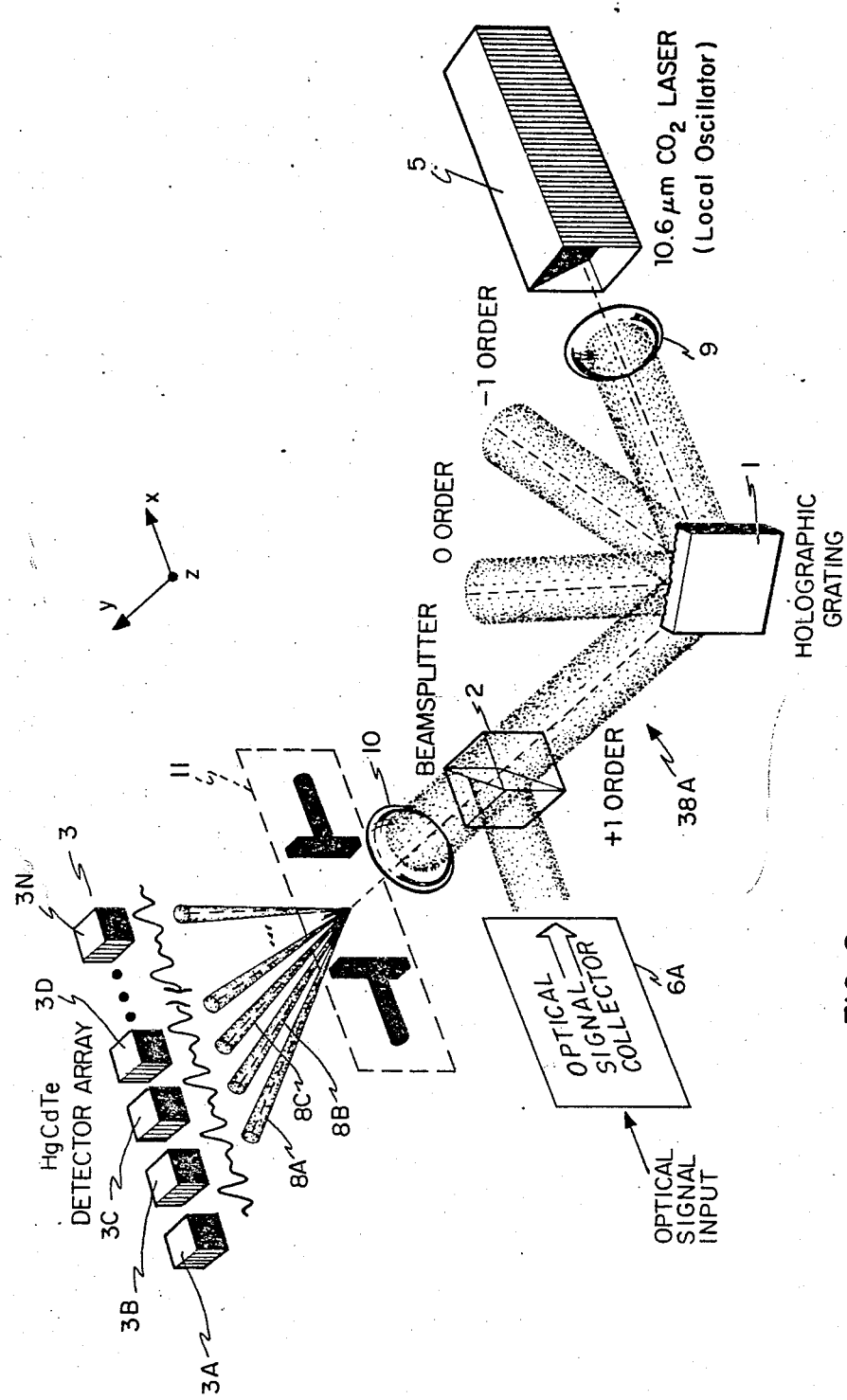
FIG. 2 is a diagrammatic representation showing a system wherein a detector array is illuminated by radiation reflected from a holographic grating.

Turning now to FIG. 2 the optical processor 38A shown is like the processor 38 in FIG. 1 but includes a few components not shown in FIG. 1. Elements that perform the same or similar functions to similar elements in FIG. 1 have applied to them the same or similar designations in FIG. 2; e.g., the optical signal collector shown at 6A in FIG. 2 may be the telescope 6 of FIG. 1.

The optical detectors 3 are shown in FIG. 2 comprising discrete detectors 3A, 3B . . . 3N each of which receives the optical-signal wavefront 34A (or some other input as later discussed) plus a local-oscillator wavefront from the holographic grating 1 in FIG. 2; input beams to the detectors 3A . . . containing both optical fields are labeled 8A, 8B . . . 8N which are directed respectively on the discrete detection elements 3A, 3B . . . 3N each of which serves to mix the two fields to provide an electrical output (i.e., the combined outputs of the detectors 3A, 3B . . . form the output 40 in FIG. 1) whose amplitude and phase are predetermined with respect to the amplitudes and phases of the other detectors in the array 3, as now explained.

The local-oscillator wavefronts are produced by a local oscillator that comprises the holographic grating 1, the laser 5 (which emits electromagnetic fields in the infrared region of the electromagnetic spectrum, here 10.6 μm), etc., as above noted. The electromagnetic fields are transformed by the holographic grating into the plurality of local-oscillator wavefronts 33; the wavefronts 33 are substantially equal in amplitude distribution to one another and they have predetermined angular alignment, both aspects being provided by the holographic grating 1.

Two types of holographic gratings have been constructed and tested. These are: (1) linear holograms produced by an optical interferometric approach using wavelength scaling of an object mask simulating the detector array and (2) binary holograms produced by a very high resolution pattern generator where a binary mask is generated in coded form so that when the mask is copied onto a photoresist film in relief form and reilluminated with the required laser radiation the desired image is reconstructed at the plurality of detectors comprising the array.

Formation of a linear hologram is discussed first. A substrate (e.g., SKN-5 glass) coated with a thin film of positive photoresist (AZ-1375) is exposed interferometrically to a uniform plane reference wavefront (i.e., a uniform plane wave) and an object wavefront in FIG. 4 in the blue or uv portion of the spectrum. The object wavefront is the diffraction pattern created through the illumination by another uniform plane wavefront of a scaled transmission mask 20 in FIG. 4 simulating the detector array to simulate a specific optical-signal wavefront. The position and sizes of the mask apertures of the mask 20 have been scaled and corrected for distortions caused by the wavelength transformation between the recording laser radiation and the laser radiation illuminating the holographic relief pattern. The holograms substrate is refractive index matched to that of the photoresist to minimize the generation of nodal planes and the resist is spun to a thick layer of approximately $\lambda/4$ with a very high uniformity of approximately $\lambda/200$. The photoresist is then chemically treated by known techniques to provide a surface relief pattern or hologram that incorporates characteristics derived from both the reference wavefront and the object wavefront; the photoresist relief pattern is transformed into a stable highly reflective surface pattern as noted later.

The size of the holographic surface is chosen such that the spatial frequency bandwidth of the holographic reconstruction in the Fourier domain exceeds that of a low pass filter 11 in FIG. 2. Consequently the optical-signal wavefronts and the local-oscillator wavefronts are bandwidth limited by the same low pass filter and exact signal-local-oscillator diffraction limited amplitude matching will occur. To improve the durability of the generated holographic relief grating the relief pattern formed in the photoresist is ion beam etched into the substrate and coated with a high reflection metallic film (e.g., gold) for high local-oscillator diffraction efficiency, as noted in FIG. 6.

Figure 6:
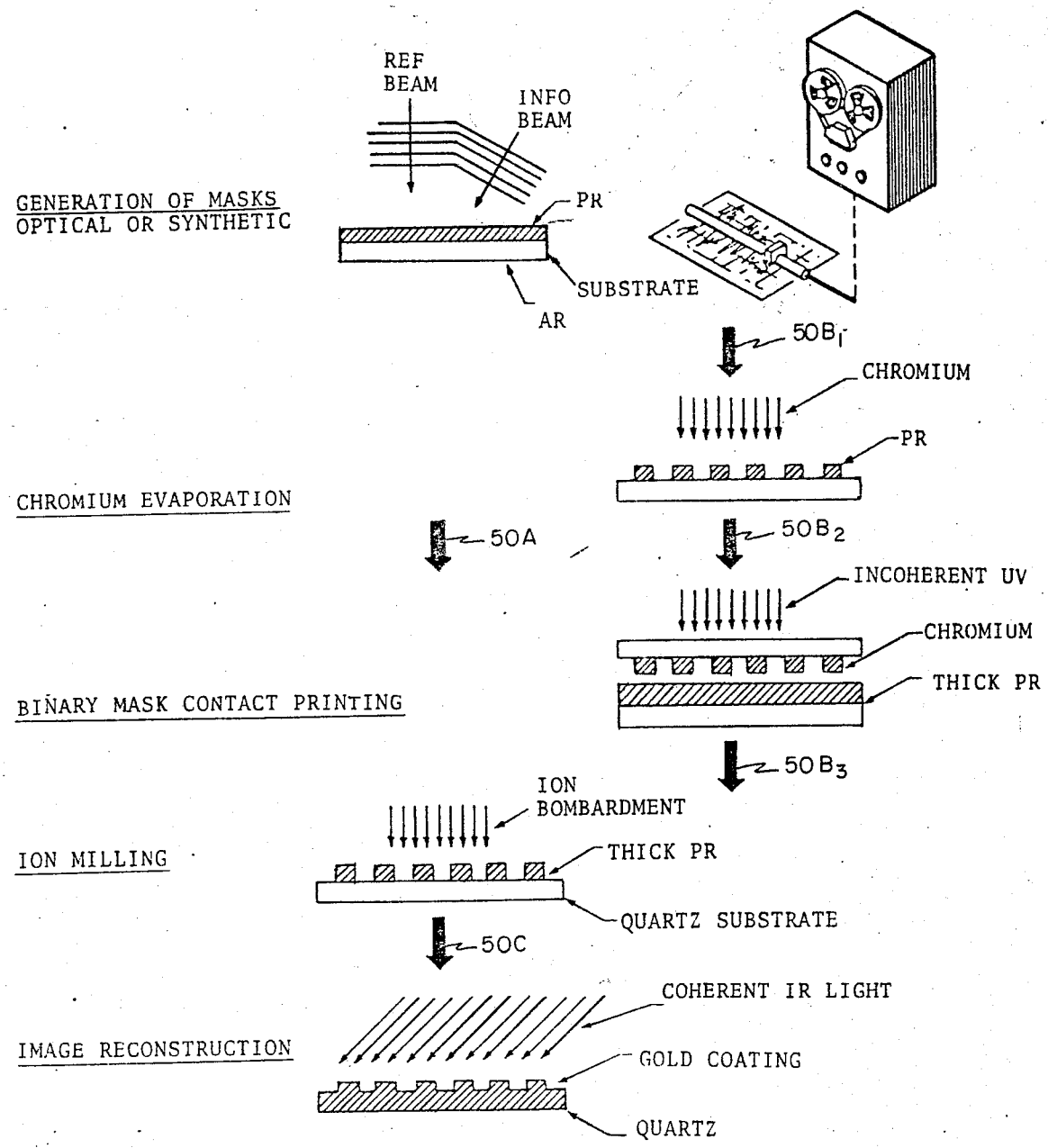
FIG. 6 shows diagrammatically processing steps for the linear hologram of FIG. 3A and the binary hologram of FIG. 3B.

The processing steps indicated in FIG. 6 by an arrow 50A refer to the process just described for producing a linear-phase relief hologram (e.g., the hologram in FIG. 3A); whereas the steps indicated by arrows $50B_1$, $50B_2$ and $50B_3$ refer to the method discussed below for producing a binary phase hologram (e.g., the hologram in FIG. 3B). The arrow labeled 50C indicates the common processing steps for both linear and binary holograms, whereby the nondurable photoresist is replaced by a durable phase relief structure (e.g., quartz with a metal coating such as gold). The grating thus formed is a surface relief grating with submicrometer resolution on the grating surface and low noise (i.e., submicrometer flatness and high relief dynamic range). The grating can be adapted to operate in the infrared, visible and ultraviolet spectral regions of the electromagnetic spectrum.

The purpose of the holographic grating is to generate a set of N uniform waves (from a single laser local oscillator) of large enough extent that they can be focused by the systems' focusing lens labeled 10 in FIG. 2 to diffraction limited (limited by the exit low pass filter) spots on each of the N detectors of the array 3. The required phase of the wavefront $\Psi(y)$ can therefore be described by $$e^{i\phi(y)} = \sum_{n=-N/2}^{N/2} e^{2\pi i n \alpha y} \quad (2)$$

where:

$\alpha$ is a spatial frequency determined by the detector spacing and the focal length of the lens; and y is the direction along the detector array $\phi(y)$ is the phase of the combined wavefront along y.

Figure 5:
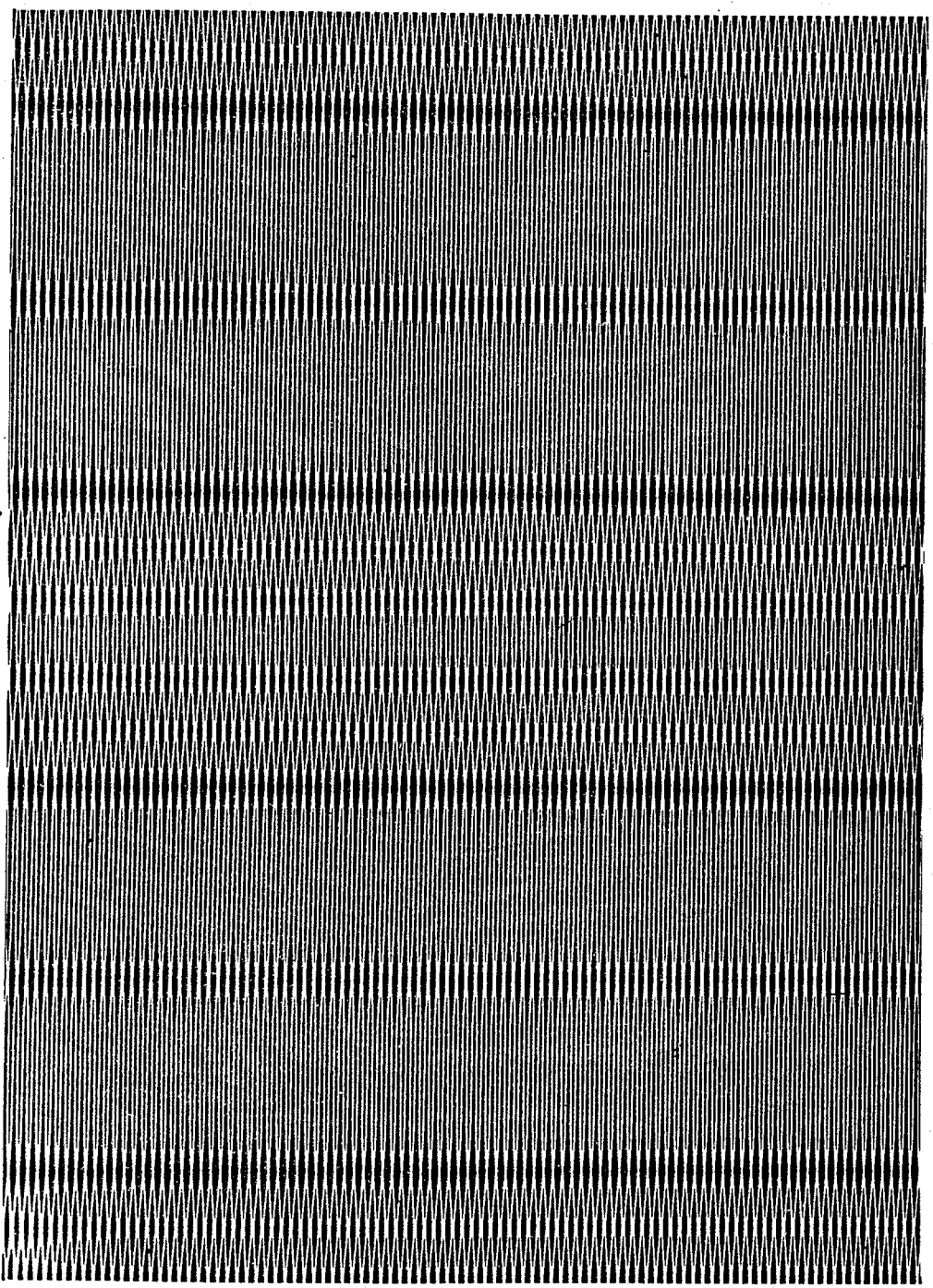
FIG. 5 is a greatly enlarged photograph of a binary, computer-generated hologram, the particular hologram shown being one that has been used to illuminate a seventeen-element, detector array.

A randomizing phase term $\Psi_n$ for each of the N uniform waves can be introduced to reduce the dynamic range of the total field and thus increase the gratings efficiency. In FIG. 5, a random binary phase code was used. If this phase is substituted in Equation (2) and terms of opposite signs combined, the phase of the total wavefront $\phi(y)$ can be described by $$\phi(y) = \arcsin\left[\text{constant} \cdot \left(-\tfrac{1}{2} + \sum_{n=1}^{N/2} \cos\left(2\pi n a y + \Psi_n\right)\right)\right] \quad (3)$$

Using this wavefront phase together with the phase detour principle, the positions of the holographic fringes can be calculated all along the holographic surface. For instance, by choosing the fringe carrier frequency and the information spatial frequency to be orthogonal (for sake of reduced sensitivity to pattern generation errors) the position of pairs of fringes can be calculated from $$x = -T\frac{\phi(y)}{2\pi} + nT \quad (4)$$
$$x = +T\frac{\phi(y) + \pi}{2\pi} + nT$$

where T is the fringe periodicity and determines the diffraction direction. It is often advantageous to choose a 50% fringe duty cycle (i.e., fringe width=T/4) to eliminate the generation of even diffraction orders and improve the first order diffraction efficiency.

A high resolution pattern generator uses Equation 3 to generate a hologram of large enough extent to satisfy the required space-bandwidth product by repeatedly plotting the fringe pairs of Equation 4. This however leads to a very large number of exposure cells ($>10^7$) and very long plotting times. The process used by the present inventors to generate only a small unit cell of the holographic mask and using a high resolution step-and-repeat process to build up the mask to the required dimensions while maintaining a required 500 Å fringe position accuracy.

After completion of the holographic mask it is transferred to a chrome coated substrate via a contact printing process. This chrome mask in turn is copied onto a substrate that is coated with positive photoresist. The mask pattern is transferred by resist exposure and development, into a binary relief pattern ($\lambda/4$ phase steps) see FIG. 3B. Again to improve the durability of the relief grating the resist relief pattern is transferred into the substrate (e.g., quartz) by means of an ion beam etching process. The resulting substrate relief surface is coated with a high reflection metallic layer for improvement of the diffraction efficiency. These steps are the steps $50B_2$–$50B_3$ and $50C$ in FIG. 6. Finally the resulting binary holographic phase relief grating is introduced into the system of FIG. 2.

With proper orthogonalization of the carrier and information directions (e.g., +1 and -1 information orders shifted around the $0^{th}$ order) as much as 70% of the local oscillator power can be transferred to the plurality of local-oscillator wavefronts.

A number of salutary consequences flow from the holographic techniques herein disclosed: e.g., the array 3 is not limited to linear configuration but can be made in the form of an array along both x and y or x, y and z directions, for example; excellent phase matching is possible over large arrays; the amplitude of the local-oscillator wavefronts can be shaped for each discrete detector; the system is relatively insensitive to telescope obscuration losses; higher resolution (i.e., sharper image quality) than with existing systemsis possible; and the hologram angular alignment is equal in complexity to a single detector alignment; simultaneous detection of a large number of separate spatial resolution elements of the optical-signal wavefront is achieved.

The holographic grating 1 in FIG. 2 can be replaced by a lens adapted to produce either a cylindrical or spherical wavefront to produce phase alignment of the local-oscillator wavefront over each of the discrete detector elements 3A, 3B . . . of the array 3. In this latter embodiment, the laser 5 and lenses 9A and 9B are repositioned through 90°.

The incoming signal to the optical signal collector in FIG. 2 can be the signal 34 in FIG. 1, but it can also be an optical communication signal or optical radiation in heterodyne spectroscopy for chemical analysis.

Further modifications of the invention herein disclosed will occur to persons skilled in the art and all such modifications are deemed to be within the spirit and scope of the invention as defined by the appended claim.

What is claimed is:

1. A heterodyne system to achieve detection of an optical-signal wavefront using a plurality of discrete detector elements operating in parallel with correct local oscillator amplitude distributions and phase relationships between the optical-signal wavefront and local-oscillator wavefronts, said system comprising:
   an array of discrete detector elements operating in parallel, each element of the array being operable to mix a local-oscillator wavefront with said optical-signal wavefront to produce an electrical output with correct amplitude and phase relationships with like outputs from the other detector elements of the array; and
   a local oscillator to produce an electromagnetic field which is transformed by optical elements within the system to produce a plurality of local-oscillator wavefronts, each wavefront of the plurality of local-oscillator wavefronts serving to illuminate a discrete detector of the array of discrete detectors, said optical elements including a holographic grating acting to transform the electromagnetic field from the local oscillator into the plurality of local-oscillator wavefronts.

2. A system as claimed in claim 1 wherein the holographic grating is operable to provide said plurality of local-oscillator wavefronts as a plurality of wavefronts of substantially equal amplitude distributions and predetermined phases.

3. Apparatus that includes the heterodyne system defined by claim 1, that further includes an optical signal collector that transforms optical signal wavefront into a transformed signal wavefront that is suitable for mixing with the plurality of local-oscillator wavefronts from said holographic grating.

4. A system as claimed in claim 1 that further includes a beam combining optical element to combine the optical-signal wavefront with the local-oscillator wavefronts and a spatial low-pass filter interposed between the beam combining element and the array of discrete detector elements to optimally shape the spatial amplitude distribution of each of the plurality of wavefronts to the sizes of the detectors in the array of discrete detector elements.

5. A system as claimed in claim 4 in which the beam combing element is a beam splitter.

6. A system as claimed in claim 1 wherein the array of discrete detector elements comprises several detectors in an arbitrary two-dimensional configuration of discrete detector elements that operate in a heretodyne mode, there being one local-oscillator wavefront for each detector.

7. A system as claimed in claim 1 wherein the holographic grating is a surface relief grating with submicrometer resolution on the grating surface, said surface being a low-noise surface.

8. A system as claimed in claim 7 wherein the holographic grating is adapted to operate in the infrared spectral region of the electromagnetic spectrum.

9. A heterodyne system to achieve detection of an optical-signal wavefront using a plurality of discrete detector elements operating in parallel with correct local oscillator amplitude distributions and phase relationships between the optical-signal wavefront and local-oscillator wavefronts, said system comprising:
an array of discrete detector elements operating in parallel, each element of the array being operable to mix a local oscillator wavefront with said optical-signal wavefront to produce an electrical output with correct amplitude and phase relationships with the outputs from the other detector elements of the array; and
a local oscillator to produce an electromagnetic field which is transformed by optical elements within the system to produce an aligned local-oscillator phase distribution simultaneously over each of the discrete detector elements of the array to detect simultaneously a number of separate spatial resolution elements of the optical-signal wavefront.

10. A heterodyne system as claimed in claim 9 wherein the local oscillator comprises a holographic grating which produces said phase distribution as a plurality of local-oscillator wavefronts of optimum amplitude and phase distributions over each of said detector elements.

11. A heterodyne system as claimed in claim 9 wherein the local oscillator comprises a lens to produce either a cylindrical or spherical wavefront to produce phase alignment of the local-oscillator wavefront over each of the discrete detector elements of the array.

12. A process for producing a holographic grating for use with a detector array in a heterodyne system, the process comprising: coating one major surface of a substrate on which the holographic grating is formed with a thin photoresist coating,
exposing the photoresist to an interference pattern of a reference wavefront and an object wavefront model, the object wavefront being constructed from a scaled model of the detector array, to simulate a specified optical-signal wavefront,
chemically developing the photoresist to provide a surface relief pattern or hologram that incorporates characteristics derived from both the reference wavefront and the object wavefront, and
transforming the photoresist relief pattern into a stable highy reflective surface relief pattern.

13. A process as claimed in claim 12 wherein the interference pattern is formed by optical wave energy in either the ultraviolet or the blue region of the electromagnetic spectrum and in which the spatial and angular relationships of the reference wavefront and the object wavefront are pre-scaled in such a way that when the surface relief pattern is re-illuminated by an infrared laser beam, whereby a plurality of scaled output wavefronts is provided by the holographic grating.

14. A process of providing a computer generated binary holographic grating that when illuminated with laser radiation will generate a plurality of local oscillator wavefronts of predetermined amplitude distributions and relationships, that comprises:
forming a binary surface relief pattern having a predetermined two-dimensional fringe distribution that operates on the laser radiation incident thereon to generate the plurality of local-oscillator wavefronts of predetermined amplitude distributions and phase relationships, which process uses a calculated Fourier transform pattern of the required amplitude and phase distribution to generate the plurality of local oscillator wavefronts; and
applying coding to convert a complex valued Fourier transform pattern into a real non-negative holographic binary phase pattern in such a way that the desired complex valued wavefront can be optically produced.

* * * * *